No. 896,408. PATENTED AUG. 18, 1908.
P. MOOSMANN.
KEY FOR WATCHMEN'S TIME DETECTORS.
APPLICATION FILED DEC. 6, 1904. RENEWED JAN. 11, 1908.
3 SHEETS—SHEET 1.
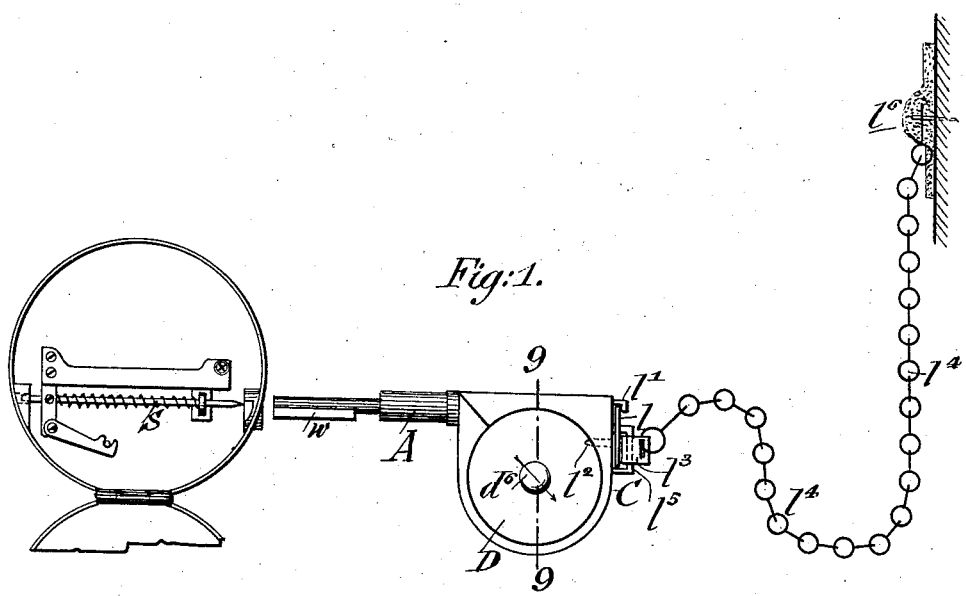
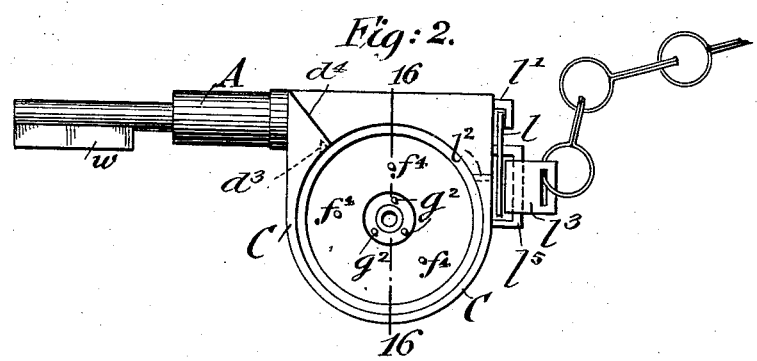
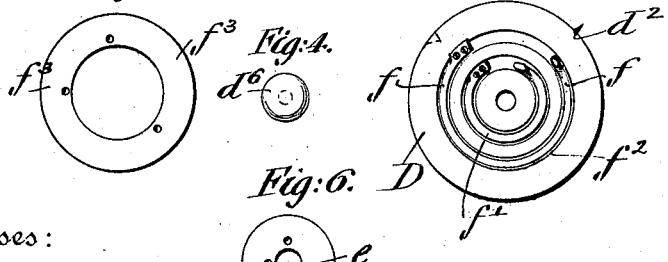
Witnesses:
Inventor
Paul Moosmann
By his Attorneys No. 896,408.  
P. MOOSMANN.  
KEY FOR WATCHMEN'S TIME DETECTORS.  
APPLICATION FILED DEC. 6, 1904. RENEWED JAN. 11, 1908.
PATENTED AUG. 18, 1908.
3 SHEETS—SHEET 2.
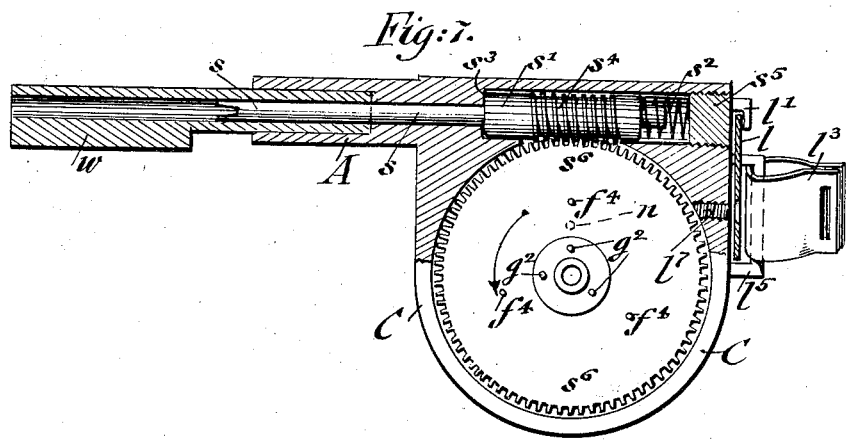
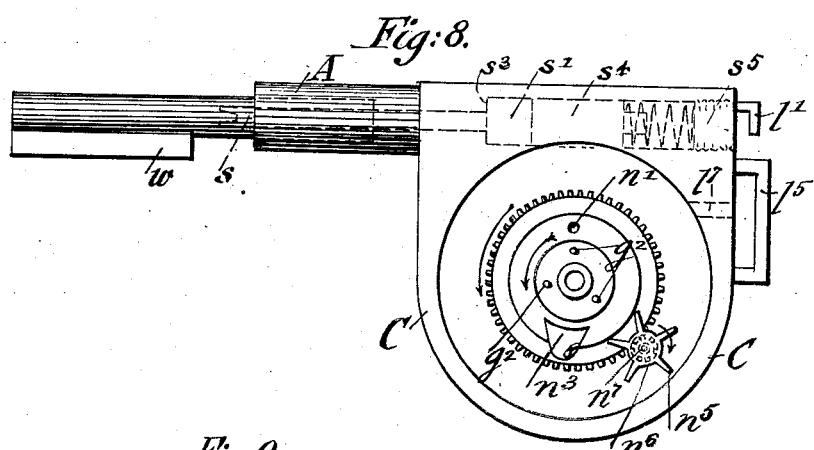
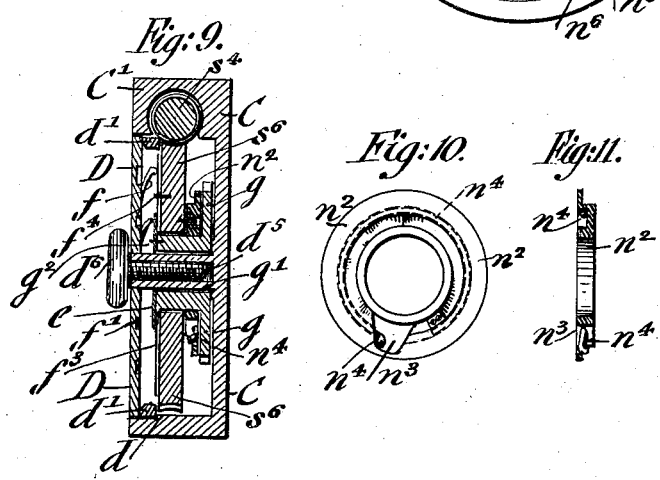
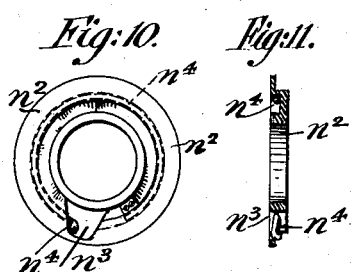
Witnesses:
David Levine
Inventor
Paul Moosmann
By his Attorneys No. 896,408. PATENTED AUG. 18, 1908.
P. MOOSMANN.
KEY FOR WATCHMEN'S TIME DETECTORS.
APPLICATION FILED DEC. 6, 1904. RENEWED JAN. 11, 1908.
3 SHEETS—SHEET 3.
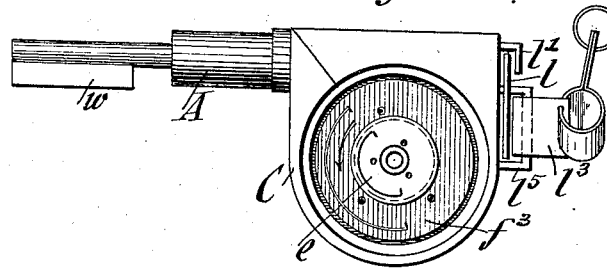
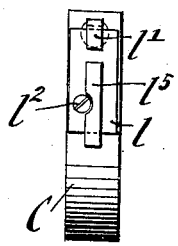
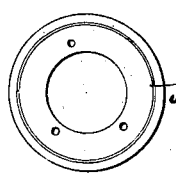
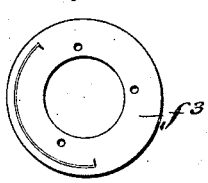
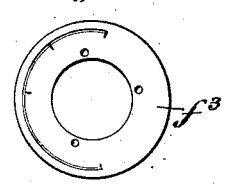
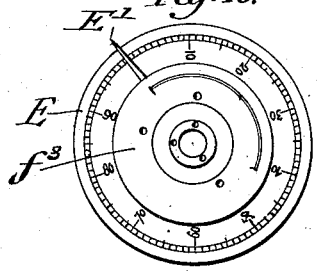
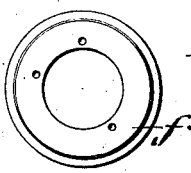
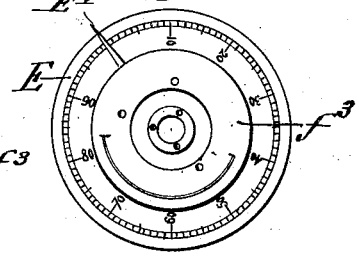
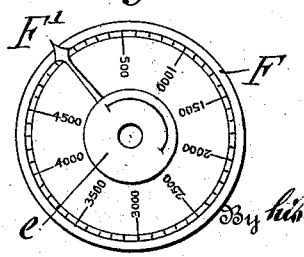
Witnesses:
David Levine
Inventor
Paul Moosmann
By his Attorneys

UNITED STATES PATENT OFFICE.

PAUL MOOSMANN, OF NEW YORK, N. Y.

KEY FOR WATCHMEN'S TIME-DETECTORS.

No. 896,408.    Specification of Letters Patent.    Patented Aug. 18, 1908.

Application filed December 6, 1904, Serial No. 235,769. Renewed January 11, 1908. Serial No. 410,444.

*To all whom it may concern:*

Be it known that I, PAUL MOOSMANN, a citizen of the Empire of Germany, residing in New York, borough of Brooklyn, in the State of New York, have invented certain new and useful Improvements in Keys for Watchmen's Time-Detectors, of which the following is a specification.

In watchmen's time-detectors, and more especially in portable time-detectors of that class in which a paper dial is rotated by a clock-train and marked from time to time by the insertion of keys suspended at different stations of the building to be watched, it frequently occurs that the time-detector carried by the watchman is tampered with by producing the marks on the dial by means of tools inserted into the device, without the watchman making regularly the rounds to all the stations where the keys are suspended, so that consequently not that full and complete record of the periodical marking as required, is obtained, and thereby to some extent the safety and security of the building to be watched jeopardized.

The object of this invention is to increase the control of the watchman by providing keys upon which, when they are used to actuate the time-detector clock, there is automatically produced an indication of such actuation.

The invention also aims to provide a time-detector key embodying recording mechanism by which the actuations of the watchman's clock by said key are automatically recorded.

A further object of the invention is to provide means whereby the exact number of actuations of the clock by the key may be ascertained from the record made by the recording mechanism of the key.

The invention also purposes the provision of a key embodying recording mechanism and provided with suspension means, the former being removable from the key only after the latter has been detached.

The invention also contemplates the provision of means whereby the removal and replacement of the cover by which the record-disk is accessible are automatically recorded on such disk.

It is also an object of the invention to provide the cover just referred to with a marking device which serves the double purpose of recording the actuations of the watchman's clock and the removal and replacement of said cover.

The invention also aims to furnish a watchman's time-detector key embodying mechanism by which two records of the actuations of the detector are made, one of these records representing the actuations of the detector up to a certain number and the other representing such actuations up to a much larger number, there being means provided whereby the actual number of actuations represented by each such record may be readily ascertained.

In the accompanying drawings, Figure 1 is a side-elevation of a watchman's time-detector key constructed in accordance with the invention, said key being shown in position for insertion into the time-detector or watchman's clock, Fig. 2 is a side-elevation of the key, drawn on a larger scale and showing the cover of the casing removed, Fig. 3 is a view of the cover looking at the inner face thereof, Fig. 4 is a view of the pin whereby the cover is held on the casing, Fig. 5 shows the larger record-disk upon which the actuations of the detector up to a certain number are recorded, Fig. 6 is a view of the smaller record-disk upon which the actuations of the detector up to a much larger number are recorded, Fig. 7 is a vertical longitudinal section of the key, Fig. 8 is a side-elevation of the key, with the cover and worm-gear removed in order to show the parts behind the latter, Fig. 9 is a section on line 9, 9 of Fig. 1, but drawn on a larger scale, Figs. 10 and 11 are respectively a rear-view and a transverse section of the push devices used in connection with the mechanism for recording on the smaller record-disk, Fig. 12 is a side-elevation of the key, with the cover removed and with the record-disks placed in position in the casing, Fig. 13 is an end-view of Fig. 12, Figs. 14, 15, 16 and 17 show the larger record-disk with different records thereon, Figs. 18 and 19 illustrate the indicating-dial for the larger record-disk and the manner in which said dial is used to ascertain the number of actuations represented by the record-line of said disk, and Fig. 20 shows the indicating-dial for reading off the actuations represented by the line on the smaller record-disk, such a disk being shown in position on said dial.

Similar letters of reference indicate corresponding parts throughout the several views.

Referring to the drawings A denotes a key, such as is used for marking the well-known watchmen's time detectors in which a time-dial is driven by a clock-train. The keys are provided with wards $w$ which differ in length at the different stations where the keys are suspended, each station having a definite length of ward, so that the keys at the different stations mark the time-dial in the watchman's clock or time-detector at different points on the face of the same. The shank of the key, instead of being made solid as heretofore, is made tubular, that is to say, in the shape of a barrel, so as to permit the insertion of an actuating spindle, S, arranged in the cover of the time-detector, into the barrel of the key, as shown in Fig. 1, said spindle being made of sufficient length and tapering at its end, in order to engage, when the key is inserted into the time-detector, the recessed end of a spindle $s$, which is arranged in the tubular extension of the key-barrel. The casing C is preferably of rectangular shape at the part adjacent to and in line with the key-barrel, but the part projecting therefrom, in which the recording-mechanism is contained, is of semi-circular shape. The inner end of the spindle $s$ is made of larger diameter so as to form a shaft $s^1$ which is forced against the interior shoulder $s^3$ of the straight portion of the casing by a helical cushion-spring $s^2$ interposed between the end of the shaft $s^1$ and a screw-plug $s^5$, the latter being provided with a diametrical groove or nick for the insertion of a screw-driver, by which the screw-plug is screwed into or out of the enlarged bore for the shaft $s^1$. Ordinarily, the screw-plug $s^5$ is covered by a plate $l$ which is retained in the end of the casing by a hook-shaped keeper $l^1$ and a fastening screw $l^2$, the head of which is counter-sunk into the plate $l$ and covered by the end link $l^3$ of a suspension-chain $l^4$ inserted into a keeper $l^5$ on the casing in line with the keeper $l^1$. The opposite end of the suspension chain $l^4$ is attached by a lead seal $l^6$ or in any other suitable manner to the station at which the key is to be suspended. The link $l^3$ covers the fastening-screw $l^2$ when the key is in a normal position of suspension, while the plate $l$ covers the screw-plug $s^5$ so as not to disclose the position of the screws. The end-link $l^3$ and plate $l$ prevent access to the screws until the suspension-chain is detached from the keeper $l^5$.

The enlarged shaft $s^1$ of the spindle $s$ is provided with a worm $s^4$, which meshes with the teeth of a worm-gear $s^6$ loosely mounted on the hub of the gear-wheel $g$ which is arranged behind the same and which turns on a central, tubular, internally threaded post $g^1$ mounted on the bottom of the casing C as shown in Fig. 9. The casing C is provided with a circumferential flange or rim $C^1$ having an interior shoulder $d$ and ring-shaped seat $d^1$ for the disk-shaped cover D, as shown in Fig. 9. The cover D is provided with a central opening which is fitted on the tubular center-post $g^1$ of the casing and provided at one point of its circumference with a projecting pin $d^2$ adapted to engage a small socket $d^3$ in the casing, adjacent an index-mark $d^4$ in the casing C, as shown clearly in Figs. 1, 2 and 3 of the drawings. The disk-shaped cover D is placed in position on the casing C by first inserting the projecting pin $d^2$ into the socket near the index mark $d^4$ and then dropping the disk on the seat $d^1$ of the casing C, after which it is clamped in position by inserting a screw $d^5$ with turned head $d^6$ into the tubular post $f^1$ of the casing C, as shown in Figs. 1 and 9. The disk-shaped cover D is provided at its underside with two marking-devices $f$, $f'$ which are made of circular spring-wires, one concentric within the other, and located in grooves $f^2$ at the underside of the cover D, one end of each marker being attached to the cover D. The free ends of said markers are bent up and provided with a composition of lead or other metal capable of making a mark when placed in contact with a paper-disk. The outer marker $f$ abuts against a paper disk $f^3$ which is placed by its center-opening in position on the hub of the worm-gear $s^6$ and securely held thereon by pins $f^4$ on the face of the worm-gear $s^6$, said pins piercing the paper-disk. Three of these pins are preferably used, as shown clearly in Figs. 2 and 7, the pins being located at the corners of a triangle the base of which is somewhat shorter than the sides. The bent-up end of the outer marking-spring $f$ is pressed into contact with the paper-disk $f^3$ when the cover D is placed in position on the casing C in order to mark on the disk first a short radial line or mark, as will be presently explained, and then an arcuate or circular line or groove as the disk is rotated by the worm-gear transmission operated by the successive actuations of the spindle S in the time-detector. As one full rotation of the paper-disk corresponds to a full rotation of the worm-gear $s^6$ which again corresponds to a definite number of individual actuations of the worm-spindle in the key by the spindle in the time-detector, the paper-disk forms a record of these actuations for a certain period of time, such as a week, after which the disk is removed, filed and a new disk placed in position in the casing of the key for the next following week, and so on, the record on the disks showing thereby that the required number of markings have been made at each station represented by a key. For removing the paper-disk $f^3$, the retaining screw $d^5$ is unscrewed and the cover removed after which a new recording-disk is placed in position in the pins of the worm-gear $s^6$ and the cover D placed again in position on the casing, the key being then again in condition for recording the actuations of the time-detector.

The exact number of actuations represented by the arcuate line on the disk $f^3$ is indicated by a device to be hereinafter described.

The removal of the worm-gear $s^6$ from the casing is prevented by means of the set-screw $l^2$, which is screwed into a threaded socket $l^7$ on the casing below the covering plate $l$, said screw serving also for holding the plate $l$ in position, the head of the screw $l^2$ being covered by the end-link $l^3$, so as to be invisible except on a careful inspection of the keys. The inner tapering end of the screw $l^2$ projects over the edge of the worm-gear $s^6$ and prevents it being lifted out of the casing for tampering with the interior construction of the key-controlling mechanism.

From the underside of the worm-wheel $s^6$ projects a pin $n$, which engages a socket $n^1$ of a push-ring $n^2$ interposed between the worm-wheel and the gear-wheel $g$ and guided on the hub of said gear-wheel. The ring $n^2$ is provided at one point of its circumference with an aperture $n^3$ through which projects the upwardly-bent end of a curved push-spring $n^4$, which is arranged in a circular groove at the underside of the ring $n^2$, as shown in Figs. 8, 10 and 11. This push-spring $n^4$ is attached at the opposite end to the push-ring $n^2$ and adapted to engage the arms of a spur-wheel $n^5$ so as to turn the latter in the direction shown by the arrow in Fig. 8 after each full rotation of the worm-gear $s^6$. The spur-wheel $n^5$ turns loosely on a stub-shaft $n^6$ attached to the bottom of the casing C, the hub of said spur-wheel carrying a pinion $n^7$ which meshes with the teeth of the gear-wheel $g$ so as to turn the same for the distance of one tooth at each engagement of the push-spring $n^4$ with one of the arms of the spur-wheel. Two of the arms of the spur-wheel $n^5$ are always in contact with the circumference of the push-ring $n^2$ so that the spur-wheel can only be turned when the arm next adjacent to the projecting end of the push-spring $n^4$ pushes back this projecting end in the aperture or recess $n^3$ far enough for permitting the free turning of the spur-wheel and the release of the spring-end from the arm after the required motion has been imparted to the spur-wheel for moving the gear-wheel $g$ forward for the distance of one tooth, and so on after every complete rotation of the gear-wheel $s^6$.

Upon the outer face of the hub of the gear wheel $g$ are located a plurality of pins $g^2$ which serve to hold against said face a small record-disk $e$, as shown in Figs. 8 and 12. This disk is arranged within the outer record disk $f^3$, and is so disposed that the inner marker $f^1$ carried by the cover abuts against the same and when the gear-wheel $g$ is rotated forms an arcuate mark thereon. It is thus obvious that when the worm-gear $s^6$ has undergone a complete rotation that the gear-wheel $g$ in being moved to the extent of one tooth will cause a slight mark to be made by the marker $f^1$ upon the inner record disk $e$, and said disk thereby forms a means for recording the actuations of the detector up to a much larger number than can be recorded by the larger disk $f$. In order to ascertain the exact number of actuations represented by the line upon the smaller record disk it is necessary to employ an indicating dial which will be hereinafter described. However, it is evident that without the use of other devices the inner and outer record disks when marked upon constitute records of the actuation of the detector.

The mechanism so far described forms a record of the actuation of the time-detector at the different stations where the keys are suspended, independently of the detector, so that the regular visiting of the individual stations by the watchman for marking the time-detector by the keys is recorded independently of and in addition to the marking of the dial of the time-detector, whereby the use of any substitute or fraudulent dial-marking devices can be readily discovered and prevented. The exchangeable paper-disks with the arc-shaped or circular records made by the marking-devices on the same form thereby a record independently of and auxiliary to the time-detector record for securing the faithful attendance of the watchman in making his regular periodical rounds to all the stations of the building placed in his care.

The surfaces of the paper record-disks are preferably coated with a suitable glaze which is capable of showing clearly the marks of the marking-points, which are preferably made of some soft metal in order to make light yet distinct marks on the record-disks, in connection with short radial marks, caused by the marking-points by the removal and replacing of the cover C, as indicated in Figs. 20 to 23; said radial marks being caused by the forcing of the springs $f^1$ in the direction of the cover by means of the worm-gear against which they abut, and by the releasing of said springs from that position, according as the cover is placed in or removed from position. By the successive actuations of the detectors the paper-disks $f^3$, $e$, are moved by the worm-gear $s^6$ and the hub of the gear-wheel $g$ respectively and marked by their corresponding markers. When the cover is removed within twenty four hours, that is to say, one day after the first or initial mark, the outer disk $f^3$ has advanced for a small distance and received a short arcuate mark, by the marking-point. The removal and replacing of the cover will add to the ends of the arc the short radial indicatory marks, as explained. When a daily record is desired and the cover removed from day to day, the radial marks continue from day to day, each at the end of a small arcuate portion which corresponds to the actuations of the keys taking place during one night; this is illustrated in Fig. 16. When a weekly record is desired, the cover is removed every week, in which case the radial mark is produced by the radial marking-points at the end of a longer arc-shaped marking-line, as shown in Fig. 14, the removal of the cover and its replacing producing each a corresponding radial mark inwardly from the arc-shaped line.

For the purpose of enabling the actual number of actuations represented by the record-lines on the large and small record-disks to be ascertained, two indicating-dials E, F are provided. The dial E is provided with graduations representing actuations up to a certain number, and with an index-hand $E^1$; while the indicating-dial F is provided with graduations which represent a much larger number of actuations, and with an index-hand $F^1$. The dial E is used in connection with the large record-disk $f^3$ to read off the number of actuations represented by the line on the latter and the dial F is similarly used in connection with the small record-disk $e$, the disks being placed for this purpose on the respective dials, as shown. It is obvious that these dials must be graduated in accordance with the number of actuations represented by the lines on their respective disks.

When the paper-disks $f^3$ are removed and placed in position on the owner's controlling-dial, as shown in Figs. 18 and 19, the owner knows by the number of actuations indicated by the arc-shaped lines on the graduations of his dial whether or not the watchman has attended properly to his beats and operated the keys at all the stations regularly for every night of the week. When for instance, the initial mark on the paper-disk is placed in line with the index-hand $E^1$ of the dial, which has been placed to zero, the number of actuations which is read off on the dial is 42, that is to say, six actuations for every night of the week, it being assumed that the watchman makes his rounds every two hours from six o'clock at night to six o'clock in the morning. When an hourly round is required, double the number of actuations would be indicated on the owner's indicating-dial.

When the paper-disk is to be used for a longer period of time, the marking continues until a complete circle is obtained, either by continuing the former arc, or when replacing it in position by doubling up on the same line, as shown in Fig. 17. When, however, the marking is continued without interruption for a term of several weeks, the beginning of the next period will not lap over the initial or starting mark, but will begin at some distance from the same. When more than say 100 actuations have been made, then the inner recording-disk $e$ will receive its mark and continue the control for every hundred actuations registered on the outer disk. In this manner the smaller paper-disk furnishes the record for a larger number of actuations and can be readily used in connection with the dial F as shown in Fig. 20 for reading off the actuations for any desired period of time.

The paper recording disks, both the larger and smaller, can be readily mailed to the owner or to the insurance company when a personal inspection of the stations at the building insured is not desired, all that is necessary being to place said disks on their corresponding indicating-dials and note how many actuations have been made within a given time since the last reading. In this manner a very effective independent record can be obtained, without any possibility of tampering with the time-detector.

Whether the paper-disks are intended to be used for a daily, monthly, or other periodical control, they perform in all cases their function in a reliable manner, indicating by the short radial marks on the arc-shaped or circular lines the time when the cover has been removed and replaced from the key-controlling-device. All that is necessary for the owner or insurance company is to keep a record of the last reading, so that the record-disks can be placed in proper position on the dials for reading off the proper record of the actuations of the keys by the watchman in charge.

Another advantage of the improved key is that if for any reason the ordinary watchman's time-clock should stop, then even if the watchman should make his regular rounds the clock would furnish absolutely no record of it; whereas with the improved key, the stopping of the clock would not materially impair the record for that particular night, as each key would show how many times it had been used. The recording mechanisms of each key is actuated by turning the keys around at the inside of the clock and as they have no connection whatever with the working movement of the clock the stopping of the same would have no effect upon the disks of the keys when used in the ordinary way, and the keys would show the same records as if the clock had been running.

Another point of advantage is that in case of a fire and the destruction of the watchman's clock in consequence thereof, there would be absolutely no proof that the watchman had been doing his duty on that particular night; but if the improved keys were used and at least some of the keys should be found they would show that they had been used.

Having thus described my invention, I claim as new and desire to secure by Letters Patent:

1. The combination, with a portable time-detector clock, of means for actuating the same, and means for automatically indicating on said means each such actuation.

2. The combination, with a time-detector, of means to mechanically actuate the same, and means carried by said actuating means whereby a record of such actuations on the latter means is automatically produced.

3. The combination, with a portable time-detector clock of the type in which a dial is rotated by a clock-train, of means to actuate said clock to mark on such dial, and means for automatically recording on said means such actuations.

4. The combination, with a portable watchman's clock, of a key insertible therein to actuate the same, and means whereby the actuations of the clock are indicated on the key.

5. The combination, with a time-detector, of a key insertible therein to actuate the same, and means for indicating on said key each such actuation.

6. The combination, with a time-detector, of a key adapted for insertion therein to actuate the same, and means carried by said key for indicating on the latter such actuations.

7. The combination, with a time-detector, of a key adapted for insertion therein to actuate the same, and means carried by said key for recording on the latter such actuations.

8. The combination, with a time-detector, of a key to actuate the same, means carried by said key to hold a record of the actuations of said detector thereby, and means for automatically forming such record.

9. The combination, with a portable time-detector, of a key to actuate the same, means carried by said key to hold a record of the actuations of said detector thereby, and means also carried by the key for automatically forming such record.

10. The combination, with a portable time-detector, of a key to actuate the same, means carried by said key to hold a record of the actuations of said detector thereby, means for forming such record, and means for indicating the number of actuations represented by such record.

11. The combination, with a time-detector, of a key embodying a ward-carrying barrel adapted for insertion and rotation therein to actuate said detector, and means carried by said key for automatically indicating on the latter such actuations.

12. The combination, with a watchman's time-detector, of a key embodying a ward-carrying barrel insertible and rotatable in said detector to actuate the same, and mechanism carried by said key for recording on the latter such rotations.

13. A watchman's time-detector key provided with mechanism for recording the actuations of a detector, and means for suspending said key, said recording mechanism being removable from the latter only upon the removal of said suspending means.

14. A key for watchman's time-detectors, provided with mechanism for recording the actuations of a detector, and an independent device for indicating the number of actuations of said recording mechanism.

15. A key for watchman's time-detectors, provided with mechanism for recording the actuations of a detector, and an indicating-dial for indicating the actuations of said mechanism.

16. A key for watchman's time-detectors, provided with mechanism for recording the actuations of a detector, said mechanism embodying a worm-gear, and means for indicating the number of rotations of said worm-gear.

17. A key for time-detectors embodying a rotary spindle, and mechanism carried by the key for recording on the key the rotations of said spindle.

18. A key for watchman's time-detectors, embodying a tubular barrel, a spindle rotatable in said barrel, and means for recording on said key the rotations of said spindle.

19. The combination, with a portable watchman's time-detector, of a key therefor, mechanism carried by said key for recording the actuations of said detector, and means for indicating the number of such actuations.

20. The combination, with a portable time-detector, of a key therefor embodying mechanism for recording the actuations thereof, and a dial for indicating the number of such actuations.

21. A watchman's time-detector key including a tubular barrel, a spindle rotatable therein, a worm-gear driven by said spindle, and means for recording the movement of said worm-gear.

22. The combination, with a watchman's clock, of a key therefor, mechanism carried by the key for indicating on the key the actuations of the clock, and means carried by the clock to automatically operate said indicating mechanism.

23. The combination, with a watchman's clock, of a key to actuate the same, mechanism carried by the key to record on the key the actuation of the clock, and means carried by the clock to operate said recording mechanism.

24. The combination, with a watchman's clock, of a key to actuate the same, mechanism carried by the key to record the actuations of the clock, and means carried by the clock for automatically operating said recording mechanism when the clock is actuated by the key.

25. The combination, with a watchman's time-detector embodying a spindle fixed against rotary movement, of a key for said time-detector provided with a rotary spindle adapted to engage said fixed spindle and to be rotated when said detector is actuated by said key, and means actuated by said rotary spindle for recording the rotations thereof.

26. A watchman's time-detector key embodying a tubular barrel provided with a ward, a rotary spindle in said barrel, and means actuated by said spindle for recording on the key the rotations thereof.

27. A watchman's time-detector key embodying a tubular ward-carrying barrel, a casing fixed to said barrel, a rotary spindle extending from said casing to the intermediate portion of said barrel, and means carried by said casing for recording the rotations of said spindle.

28. The combination, with a time-detector, of a key therefor, means carried by said key for mounting a record-disk, and means for automatically recording by a line upon such disk the actuations of said detector by said key.

29. The combination, with a time-detector, of a key therefor, means carried by said key for mounting a record-disk, means for automatically recording by a line upon such disk the actuations of said detector by said key, and a dial for indicating the number of actuations represented by such line.

30. In combination, with a time-detector, a key therefor, means for mounting a record-disk on said key, means for automatically recording by a line upon such disk the actuations of said detector by said key, and independent indicating means adapted to be placed in or out of register with such disk.

31. A watchman's time-detector key embodying a rotary spindle, a disk-carrying worm-gear driven thereby, and a device to mark upon the disk.

32. A watchman's time-detector key embodying a rotary spindle, a casing, a worm-gear in said casing rotatable by said spindle, means on said worm-gear to position a record-disk, a cover for said casing, and a marker carried by said cover.

33. A key such as described embodying a rotary spindle provided with a worm, a worm-wheel meshing with said worm, and means associated with said worm-wheel for recording the actuations thereof.

34. A watchman's time-detector key embodying a ward-carrying barrel, a casing, means in said casing to rotate a record-disk, a cover for said casing, and a marker mounted on said cover.

35. In combination, a watchman's time-detector, a key fitting therein, means carried by said key to mount a record-disk, and means also carried by said key for automatically recording upon such disk the actuations of said detector by said key.

36. A watchman's time-detector key including a casing, a cover therefor, and means in said casing for recording the number of actuations of a detector and for indicating the removal or replacement of said cover.

37. A watchman's time-detector key including a casing, means in said casing to mount a record-disk, a cover for said casing, and means for automatically recording on said disk the removal of said cover.

38. A watchman's time-detector key including a casing, mechanism in said casing for recording the actuations of a detector and embodying means for rotatably mounting a record-disk, a cover for said casing, and means carried by said cover for recording by radial marks on said disk the removal or replacement of said cover.

39. A watchman's time-detector key including a casing, means in said casing to mount a record-disk, means for rotating such disk, a cover for said casing, and means carried by said cover for recording on such disk the movement thereof and the removal and replacement of said cover.

40. A watchman's time-detector key including a casing, a worm-gear journaled therein and rotatable by the actuation of a detector, means to position a record-disk on said worm-gear, a cover for said casing, and means for recording by an arcuate line on said disk the movement of said worm-gear, and by radial marks thereon the removal or replacement of said cover.

41. The combination, with a time-detector, of a key to actuate the same, means carried by said key for recording such actuations up to a certain number, and other means operated by said first-named means for recording such actuations up to a larger number.

42. A watchman's time-detector, in combination, with a key to actuate the same, means carried by said key for recording such actuations up to a certain number, and other means for recording such actuations up to a larger number.

43. The combination, with a time-detector, of a key to actuate the same, mechanism carried by said key for recording such actuations, and other recording mechanism operated periodically by said first-named mechanism.

44. A watchman's time-detector key including a worm-gear, means for recording the movement of said worm-gear, a gear-wheel periodically rotated by said worm-gear, and means for recording the movement of said gear-wheel.

45. A key for time-detectors embodying a worm-gear rotatable upon the actuation of a detector, means on said worm-gear to position a record-disk, a gear-wheel, mechanism interposed between said worm-gear and gear-wheel whereby the latter is rotated to the extent of one tooth upon each complete rotation of the former, means on said gear-wheel to position a record-disk, and marking devices intended to bear against both of said disks.

46. A key for watchmen's time-detectors comprising a casing, a disk-carrying worm-gear in said casing rotatable upon each actuation of a detector, a gear-wheel having a disk-carrying hub extending through said worm-gear, mechanism interposed between said worm-gear and gear-wheel whereby the latter is rotated to the extent of one tooth upon each complete rotation of the former, a cover for said casing, and marking devices carried by said cover, one to bear against each such disk.

In testimony, that I claim the foregoing as my invention, I have signed my name in presence of two subscribing witnesses.

PAUL MOOSMANN.

Witnesses:
PAUL GOEPEL,
HENRY J. SUHRBIER.